US012759333B2

(12) United States Patent
Niu et al.

(10) Patent No.: US 12,759,333 B2
(45) Date of Patent: Oct. 13, 2026

(54) MANUFACTURING METHOD FOR HOUSING

(71) Applicant: ASUSTEK COMPUTER INC., Taipei (TW)

(72) Inventors: Er-Bao Niu, Taipei (TW); Po-Wen Huang, Taipei (TW); Yu-Chun Yang, Taipei (TW); Tao Chen, Taipei (TW); Guo-Lin Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 185 days.

(21) Appl. No.: 18/760,912

(22) Filed: Jul. 1, 2024

(65) Prior Publication Data

US 2025/0178372 A1 Jun. 5, 2025

(30) Foreign Application Priority Data

Dec. 4, 2023 (TW) ................................ 112147069

(51) Int. Cl.
*B41M 5/035* (2006.01)

(52) U.S. Cl.
CPC ........ *B41M 5/0358* (2013.01); *B41M 5/0356* (2013.01); *B41M 2205/02* (2013.01)

(58) Field of Classification Search
CPC .......................... B41M 5/0258; B41M 5/0256
See application file for complete search history.

(56) References Cited

U.S. PATENT DOCUMENTS

| | | | |
|---|---|---|---|
| 2014/0113073 | A1 | 4/2014 | Peng et al. |
| 2020/0269464 | A1 | 8/2020 | Bahl |

FOREIGN PATENT DOCUMENTS

| | | | |
|---|---|---|---|
| CN | 1840320 | * | 10/2006 |
| CN | 102534485 | A | 7/2012 |
| CN | 103722668 | * | 4/2014 |
| CN | 104812192 | A | 7/2015 |
| CN | 206282176 | U | 6/2017 |
| CN | 107227477 | A | 10/2017 |
| CN | 113186577 | A | 7/2021 |
| CN | 116233289 | * | 6/2023 |
| CN | 116233289 | A | 6/2023 |
| JP | 3661521 | * | 6/2005 |
| TW | 201336365 | A | 9/2013 |

* cited by examiner

*Primary Examiner* — Edmund H Lee
(74) *Attorney, Agent, or Firm* — MUNCY, GEISSLER, OLDS & LOWE, P.C.

(57) ABSTRACT

A manufacturing method for a housing is provided. The manufacturing method includes: providing a substrate, where the substrate includes a metal member and a plastic member combined with the metal member, the substrate includes an appearance surface, and the appearance surface extends from the metal member to the plastic member; cleaning the appearance surface, and performing surface treatment on the appearance surface to form an oxide film; forming a colored pattern on a heat-insulating film by using a color material; and placing the heat-insulating film on the appearance surface, and transferring the colored pattern to the appearance surface by dye sublimation.

10 Claims, 4 Drawing Sheets

MANUFACTURING METHOD FOR HOUSING

CROSS-REFERENCE TO RELATED APPLICATION

This application claims the priority benefit of Taiwan application serial No. 112147069, filed on Dec. 4, 2023. The entirety of the above-mentioned patent application is hereby incorporated by reference herein and made a part of the specification.

BACKGROUND OF THE INVENTION

Field of the Invention

The disclosure relates to a manufacturing method for a housing, and in particular, to a manufacturing method for a housing that is applicable to an electronic device.

Description of the Related Art

With popularization of an electronic product, a user has an increasingly high requirement for a product appearance. To satisfy the requirement of the user, a housing material of the electronic product is increasingly diverse. In addition to a conventional plastic material and a conventional aluminum alloy material, a housing structure that combines metal and plastic together is also developed.

Conventionally, there are two appearance treatment processes for combining the metal and the plastic together. One is to simultaneously treat outer surfaces of the metal and the plastic by painting; and the other is to separately treat the metal and the plastic. In an embodiment, the metal part is anodized, and the plastic is treated during injection molding.

The foregoing treatment manners have the following disadvantages. First, in the conventional treatment processes, films are not formed on the metal and the plastic simultaneously. Second, although the metal and the plastic are treated together by painting, the treatment manner is limited and it is difficult to present diversified surface effect.

BRIEF SUMMARY OF THE INVENTION

The disclosure provides a manufacturing method for a housing. The manufacturing method includes: providing a substrate, where the substrate includes a metal member and a plastic member combined with the metal member, the substrate includes an appearance surface, and the appearance surface extends from the metal member to the plastic member; cleaning the appearance surface, and performing surface treatment on the appearance surface to form an oxide film; forming a colored pattern on a heat-insulating film by using a color material; and placing the heat-insulating film on the appearance surface, and transferring the colored pattern to the appearance surface by dye sublimation.

Through the manufacturing method provided in the disclosure, a colored pattern is formed on an appearance surface of a substrate obtained by combining metal and plastic, and is not limited to conventional painting manner, thereby being conducive to providing more diverse surface effect.

DETAILED DESCRIPTION OF THE EMBODIMENTS

More detailed descriptions of specific embodiments of the disclosure are provided below with reference to the accompanying drawings. The features and advantages of the disclosure are described more clearly according to the following description and claims. It is to be noted that all of the drawings use very simplified forms and imprecise proportions, only being used for assisting in conveniently and clearly explaining the objective of the embodiments of the disclosure.

Figure 1:
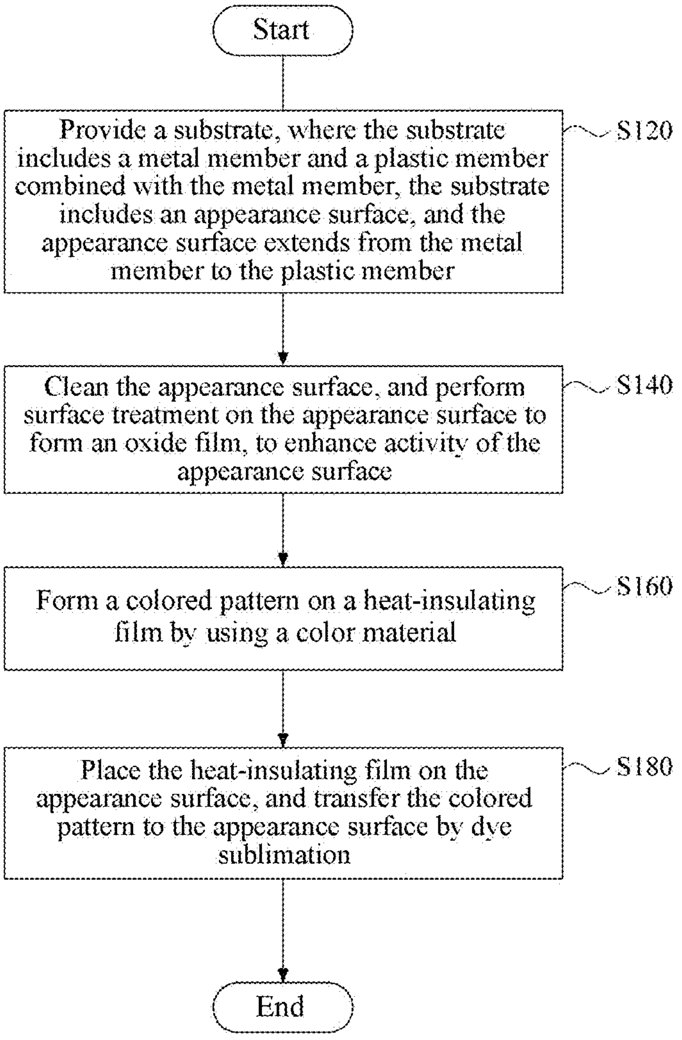
FIG. 1 is a flowchart of a manufacturing method for a housing according to an embodiment of the disclosure.

FIG. 1 is a flowchart of a manufacturing method for a housing according to an embodiment of the disclosure. The manufacturing method for a housing includes the following steps.

First, as shown in step S120, a substrate is provided. The substrate includes a metal member and a plastic member combined with the metal member, the substrate includes an appearance surface, and the appearance surface extends from the metal member to the plastic member. In an embodiment, the metal member is made of an aluminum alloy, and the plastic member is made of polyphenylene sulfide (PPS) or polybutylene terephthalate (PBT).

In an embodiment, the step is that the metal member and the plastic member that are independently completed are combined together by using a nano molding technology (Nano Molding Technology, NMT) to form the substrate in the disclosure.

Then, as shown in step S140, the appearance surface is cleaned, and surface treatment is performed on the appearance surface to form an oxide film, to enhance activity of the appearance surface.

In an embodiment, in the step, a chemical cleaning and film forming treatment is performed on the substrate. In an embodiment, in the step, the chemical cleaning and film forming treatment is performed by using an anode treatment device and a treatment solution. A component of the treatment solution includes, in an embodiment, 5 wt % to 15 wt % for hydrochloric acid, 7 wt % to 11 wt % for sulfuric acid, 0.1 wt % to 0.5 wt % for sodium dodecylbenzene sulfonate, 0.05 wt % to 0.2 wt % for sodium nitrite, and 3 wt % to 9 wt % for silicon fluoride, and a remaining part is filled with pure water.

In step S140, not only is deep cleaning performed on a product surface and hydrophilicity of the product surface improved, but also an oxide film is formed to provide effect such as anti-oxidation and dust-proofing.

Next, as shown in step S160, a colored pattern is formed on a heat-insulating film by using a color material. In an embodiment, in the step, the colored pattern is formed on the heat-insulating film by printing. A manufacturing method for the color material is described in more detail in a corresponding part in FIG. 2.

The heat-insulating film is designed to withstand a high temperature, in an embodiment, 200 degrees Celsius, required for dye sublimation of the color material, without being significantly shrunk, stretched, or deformed in a high temperature environment. In an embodiment, the heat-insulating film is made of an organic fiber aerogel composite, which has a low thermal conductivity and is not shrunk, stretched, or deformed in the high temperature environment.

Then, as shown in step S180, the heat-insulating film is placed on the appearance surface, and the colored pattern is transferred to the appearance surface by dye sublimation. In an embodiment, the colored pattern is transferred to the appearance surface by vacuum dye sublimation. Specifically, the heat-insulating film and the substrate are placed in a vacuum space so that the heat-insulating film is in close contact with the appearance surface of the substrate. Then the substrate and the heat-insulating film are heated to transfer the colored pattern to the appearance surface by dye sublimation. A specific embodiment of this step is described in more detail in a corresponding part in FIG. 3.

Figure 2:
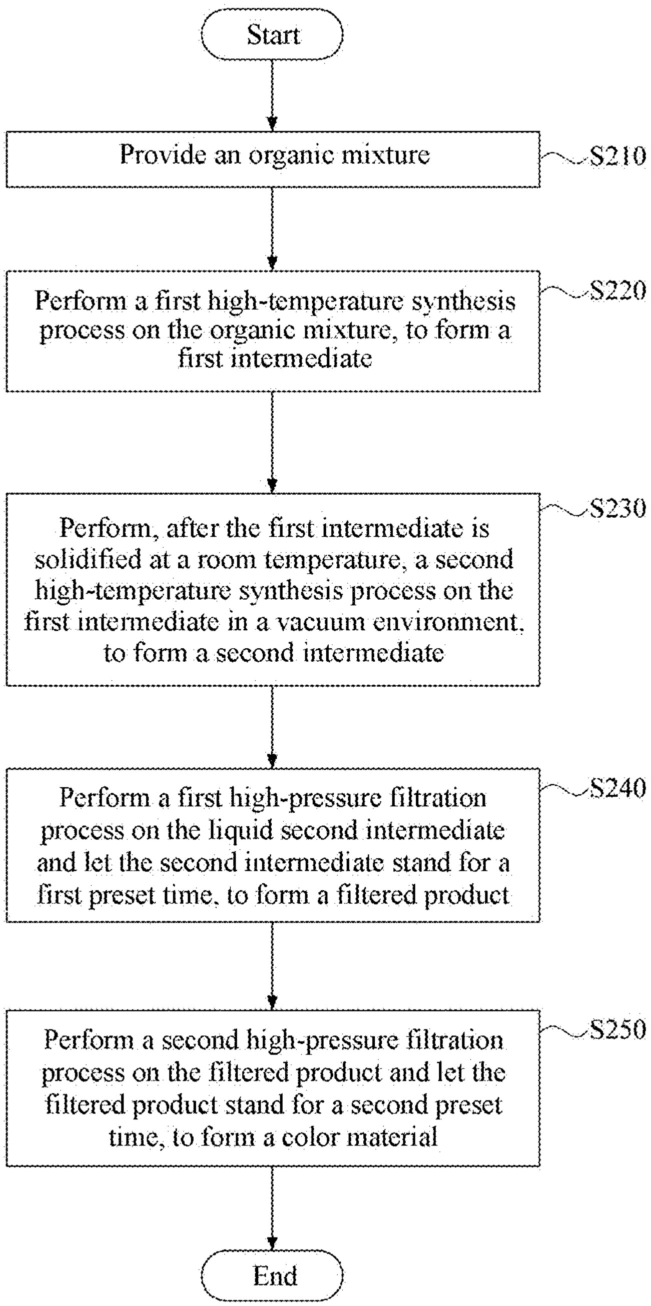
FIG. 2 is a flowchart of an embodiment of a manufacturing method for a color material used in the manufacturing method for a housing in FIG. 1.

FIG. 2 is a flowchart of an embodiment of a manufacturing method for a color material used in the manufacturing method for a housing in FIG. 1.

First, as shown in step S210, an organic mixture is provided. The organic mixture includes a natural pigment and preservative, a vehicle, an adhesive, a filler, a wetting agent, a solidifying agent, and the like.

In an embodiment, the organic mixture includes 23 wt % to 31 wt % for the natural pigment and preservative, 17 wt % to 26 wt % for the vehicle, 11 wt % to 16 wt % for the adhesive, 6 wt % to 11 wt % for the filler, 3 wt % to 7 wt % for the wetting agent, and 3.5 wt % to 8.5 wt % for the solidifying agent. In an embodiment, the organic mixture includes 5 wt % to 10 wt % for glycerin and 1.5 wt % to 3.5 wt % for gum arabic as the adhesive. In an embodiment, the organic mixture includes 1 wt % to 3 wt % for ox bile as the wetting agent. In an embodiment, the organic mixture includes 2.5 wt % to 5.5 wt % zinc oxide as the preservative. In an embodiment, the organic mixture includes 2 wt % to 4 wt % for cadmium yellow, 1.5 wt % to 4.5 wt % for toluidine red, or 2 wt % to 4 wt % for benzidine yellow as the natural pigment.

Subsequently, as shown in step S220, a first high-temperature synthesis process is performed on the organic mixture, to form a first intermediate. In an embodiment, a process temperature of the first high-temperature synthesis process is 180° C. to 280° C.

Then, as shown in step S230, a second high-temperature synthesis process is performed, after the first intermediate is solidified at a room temperature, on the first intermediate in a vacuum environment, to form a second intermediate. In an embodiment, a process temperature of the second high-temperature synthesis process is 230° C. to 330° C.

Next, as shown in step S240, a first high-pressure filtration process is performed on the liquid second intermediate and the second intermediate stands for a first preset time, to form a filtered product. In an embodiment, the first high-pressure filtration process is performed by using a 1000-mesh filter. The first preset time is 60 hours to 84 hours. Further, in an embodiment, the first preset time is 72 hours.

Then, as shown in step S250, a second high-pressure filtration process is performed on the filtered product and the filtered product stands for a second preset time, to form the color material. In an embodiment, the second high-pressure filtration process is performed by using a 2000-mesh filter. In an embodiment, the second preset time is shorter than the first preset time. In an embodiment, the second preset time is 36 hours to 60 hours. Further, in an embodiment, the second preset time is 48 hours.

Figure 3:
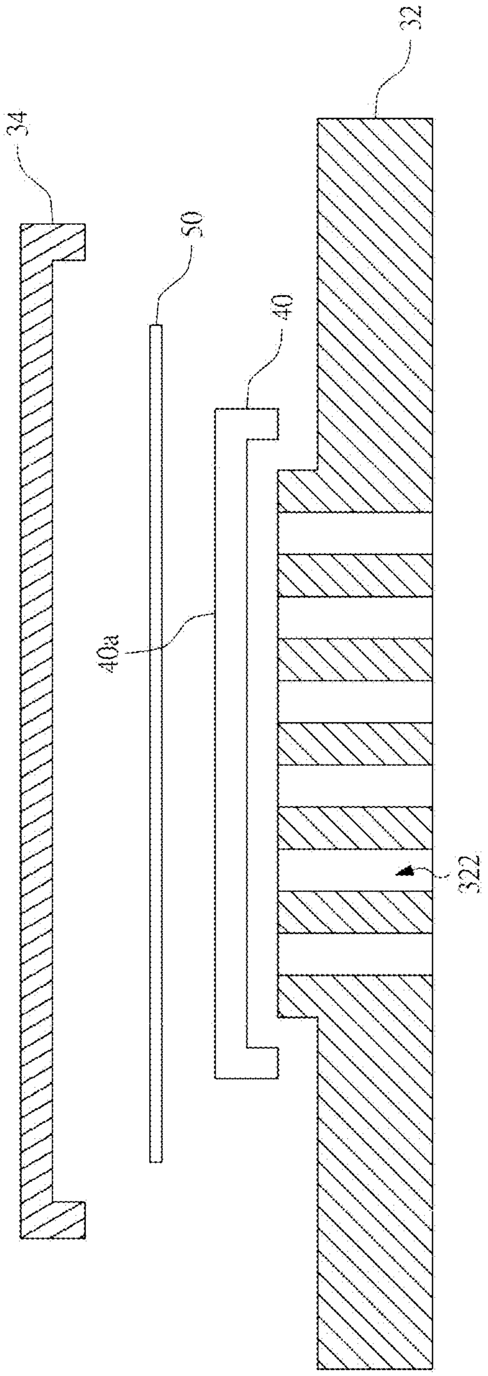
FIG. 3 is a schematic diagram of a vacuum dye sublimation device used in step S180.

FIG. 3 is a schematic diagram of a vacuum dye sublimation device used in step S180.

As shown in the figure, a vacuum dye sublimation device 30 includes a base 32 and an upper cover 34. A substrate 40 is placed on the base 32 with an appearance surface **40*a* facing upward. The base 32 includes a plurality of openings 322 connected to a vacuum pump (not shown in the figure). A heat-insulating film 50 is placed on the substrate 40. The upper cover 34 covers the base 32** to form a sealed space.

During operation, the vacuum pump discharges air in the sealed space through the openings 322, so that the heat-insulating film 50 is closely attached to the substrate 40. In addition, the base 32 or the upper cover 34 heats the substrate 40, so that a colored pattern on the heat-insulating film 50 is transferred to the appearance surface **40*a*. In an embodiment, the colored pattern on the heat-insulating film 50 is transferred to the appearance surface 40*a*** by dye sublimation.

A feature of the vacuum dye sublimation device 30 is providing effect of dye sublimation in a vacuum environment, so that the appearance surface **40*a* of the substrate 40** including both a metal member and a plastic member is integrally colored or formed with a special pattern or graphic.

Figure 4:
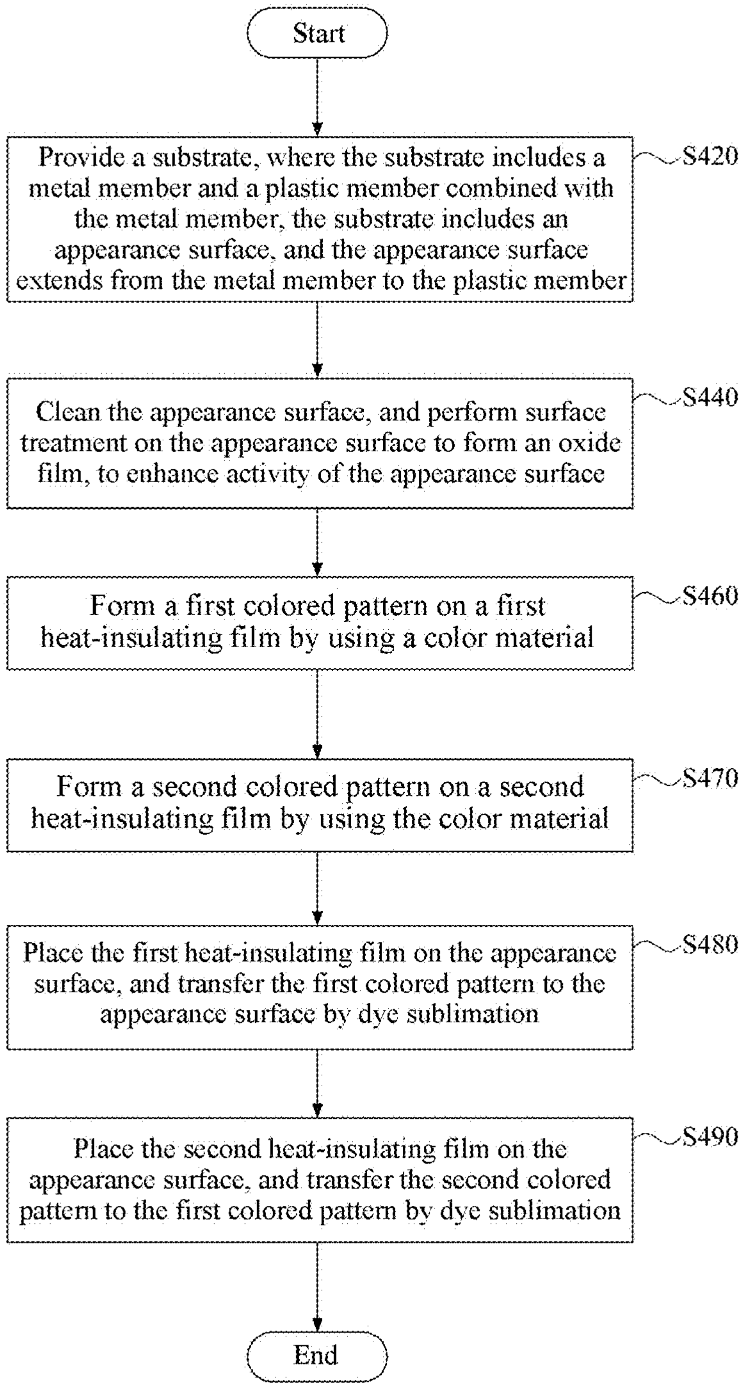
FIG. 4 is a flowchart of an embodiment of a manufacturing method for a housing according to another embodiment of the disclosure.

FIG. 4 is a flowchart of a manufacturing method for a housing according to another embodiment of the disclosure. The manufacturing method for a housing includes the following steps.

First, as shown in step S420, a substrate is provided. The substrate includes a metal member and a plastic member combined with the metal member, the substrate includes an appearance surface, and the appearance surface extends from the metal member to the plastic member. In an embodiment, the step is that the metal member and the plastic member that are independently completed are combined together by using a nano molding technology to form the substrate in the disclosure.

Then, as shown in step S440, the appearance surface is cleaned, and surface treatment is performed on the appearance surface to form an oxide film, to enhance activity of the appearance surface. The step is similar to step S140 in FIG. 1.

Next, as shown in step S460, a first colored pattern is formed on a first heat-insulating film by using a color material.

Then, as shown in step S470, a second colored pattern is formed on a second heat-insulating film by using the color material. The first colored pattern is different from the second colored pattern.

The foregoing processes of forming the first colored pattern on the first heat-insulating film and forming the second colored pattern on the second heat-insulating film are similar to step S160 in FIG. 1.

In addition, although the first colored pattern and the second colored pattern are formed by using the same color material in this embodiment, the disclosure is not limited thereto. According to an actual requirement, a first colored pattern and a second colored pattern that have different color features are also formed by deploying different color materials.

Then, as shown in step S480, the first heat-insulating film is placed on the appearance surface, and the first colored pattern is transferred to the appearance surface by dye sublimation. The step is similar to step S180 in FIG. 1.

Then, as shown in step S490, the second heat-insulating film is placed on the appearance surface, and the second colored pattern is transferred to the first colored pattern by dye sublimation, to improve three-dimensional effect of a pattern.

Through the manufacturing method provided in the disclosure, a colored pattern is formed on an appearance surface of a substrate obtained by combining metal and plastic, and is not limited to conventional painting manner, thereby being conducive to providing more diverse surface effect.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A manufacturing method for a housing, comprising:

providing a substrate, wherein the substrate comprises a metal member and a plastic member combined with the metal member, the substrate comprises an appearance surface, and the appearance surface extends from the metal member to the plastic member;

cleaning the appearance surface, and performing surface treatment on the appearance surface to form an oxide film;

forming a colored pattern on a heat-insulating film by using a color material; and placing the heat-insulating film on the appearance surface, and transferring the colored pattern to the appearance surface by dye sublimation, wherein a manufacturing method for the color material comprises:

providing an organic mixture, wherein the organic mixture comprises a natural pigment and preservative, a vehicle, an adhesive, a filler, a wetting agent, and a solidifying agent;

performing a first high-temperature synthesis process on the organic mixture, to form a first intermediate;

performing, after the first intermediate is solidified at a room temperature, a second high-temperature synthesis process on the first intermediate in a vacuum environment, to form a second intermediate;

performing a first high-pressure filtration process on the liquid second intermediate and letting the second intermediate stand for a first preset time, to form a filtered product; and performing a second high-pressure filtration process on the filtered product and letting the filtered product stand for a second preset time, to form the color material.

2. The manufacturing method for a housing according to claim 1, wherein the organic mixture comprises 23 wt % to 31 wt % for the natural pigment and preservative, 17 wt % to 26 wt % for the vehicle, 11 wt % to 16 wt % for the adhesive, 6 wt % to 11 wt % for the filler, 3 wt % to 7 wt % for the wetting agent, and 3.5 wt % to 8.5 wt % for the solidifying agent.

3. The manufacturing method for a housing according to claim 1, wherein a process temperature of the first high-temperature synthesis process is 180° C. to 280° C.

4. The manufacturing method for a housing according to claim 1, wherein a process temperature of the second high-temperature synthesis process is 230° C. to 330° C.

5. The manufacturing method for a housing according to claim 1, wherein the first high-pressure filtration process is performed by using a 1000-mesh filter, and the first preset time is 60 hours to 84 hours.

6. The manufacturing method for a housing according to claim 1, wherein the second high-pressure filtration process is performed by using a 2000-mesh filter, and the second preset time is 36 hours to 60 hours.

7. The manufacturing method for a housing according to claim 1, wherein the step of cleaning the appearance surface, and performing surface treatment on the appearance surface to form an oxide film is cleaning the appearance surface by using a treatment solution and performing surface treatment on the appearance surface, wherein the treatment solution comprises 5 wt % to 15 wt % for hydrochloric acid, 7 wt % to 11 wt % for sulfuric acid, 0.1 wt % to 0.5 wt % for sodium dodecylbenzene sulfonate, 0.05 wt % to 0.2 wt % for sodium nitrite, and 3% to 9% for silicon fluoride.

8. The manufacturing method for a housing according to claim 1, wherein the metal member is made of an aluminum alloy, and the plastic member is made of polyphenylene sulfide (PPS) or polybutylene terephthalate (PBT).

9. The manufacturing method for a housing according to claim 1, wherein the heat-insulating film is a first heat-insulating film, the colored pattern is a first colored pattern, and the manufacturing method further comprises:

forming a second colored pattern on a second heat-insulating film by using the color material; and placing the second heat-insulating film on the appearance surface after the first colored pattern is transferred to the appearance surface, and transferring the second colored pattern to the first colored pattern by dye sublimation.

10. The manufacturing method for a housing according to claim 1, wherein the step of transferring the colored pattern to the appearance surface by dye sublimation is placing the heat-insulating film and the substrate in a vacuum space to cause the heat-insulating film to be in close contact with the appearance surface, and transferring the colored pattern to the appearance surface by dye sublimation.

* * * * *